Figure 5:
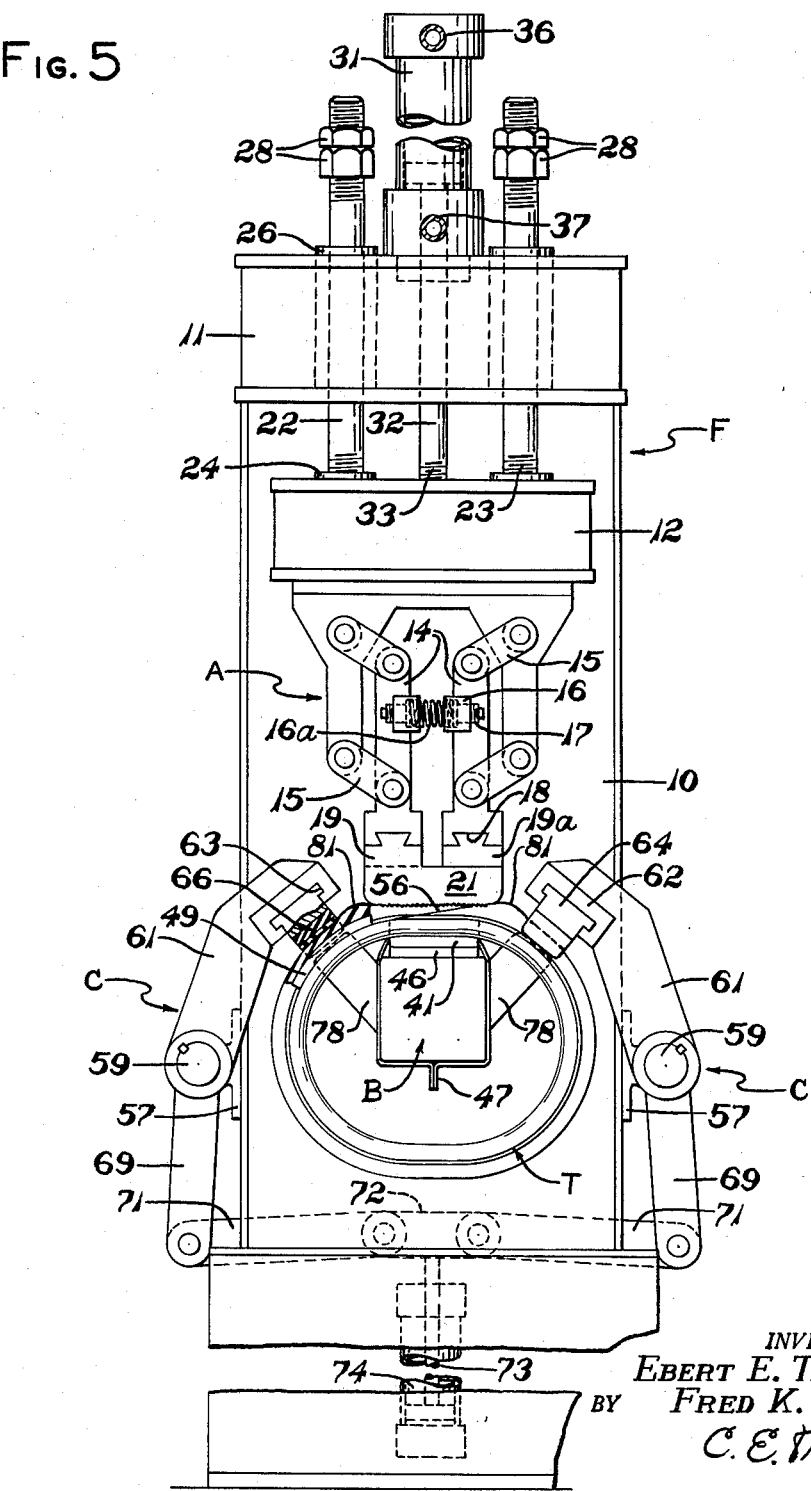

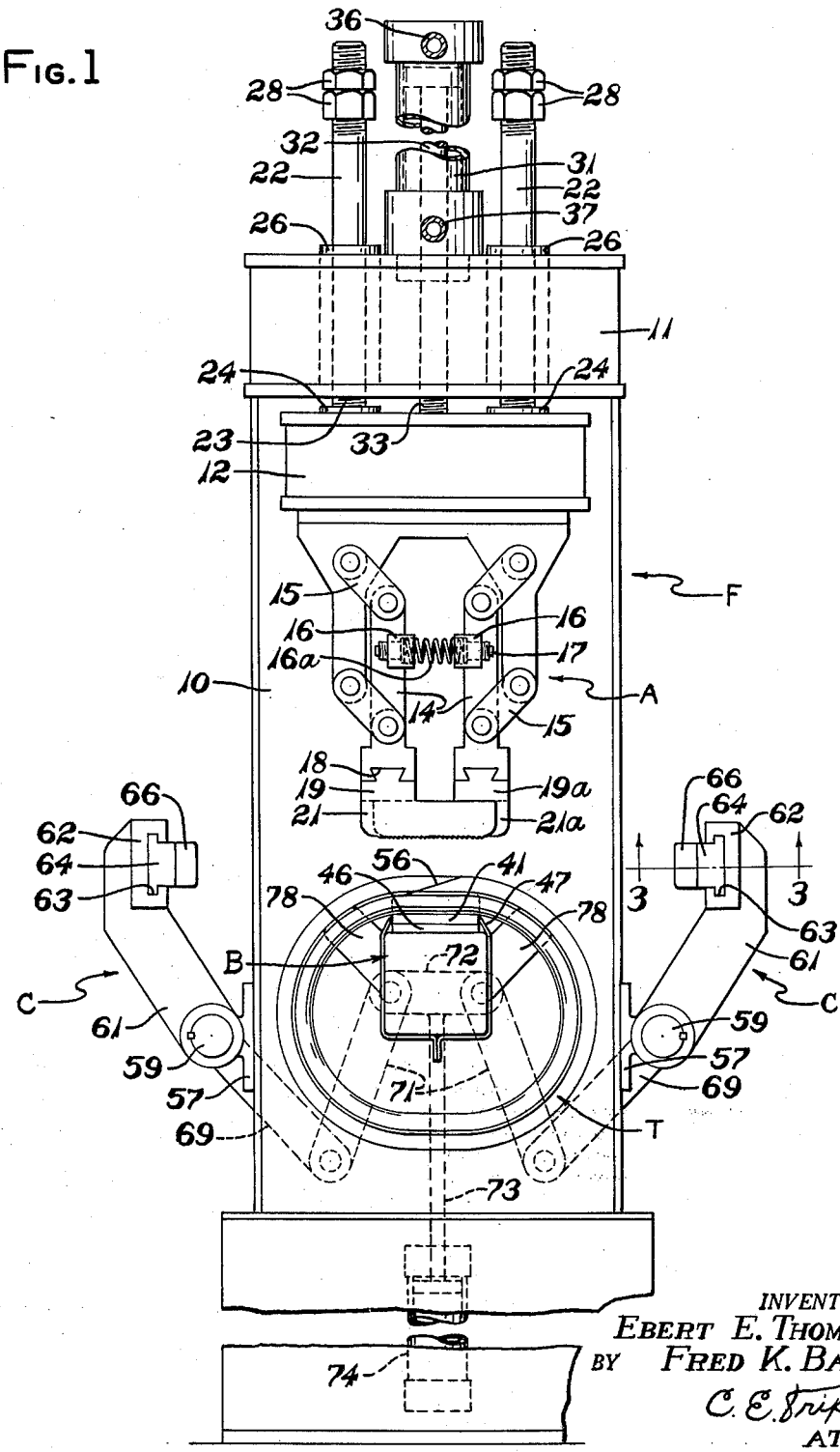

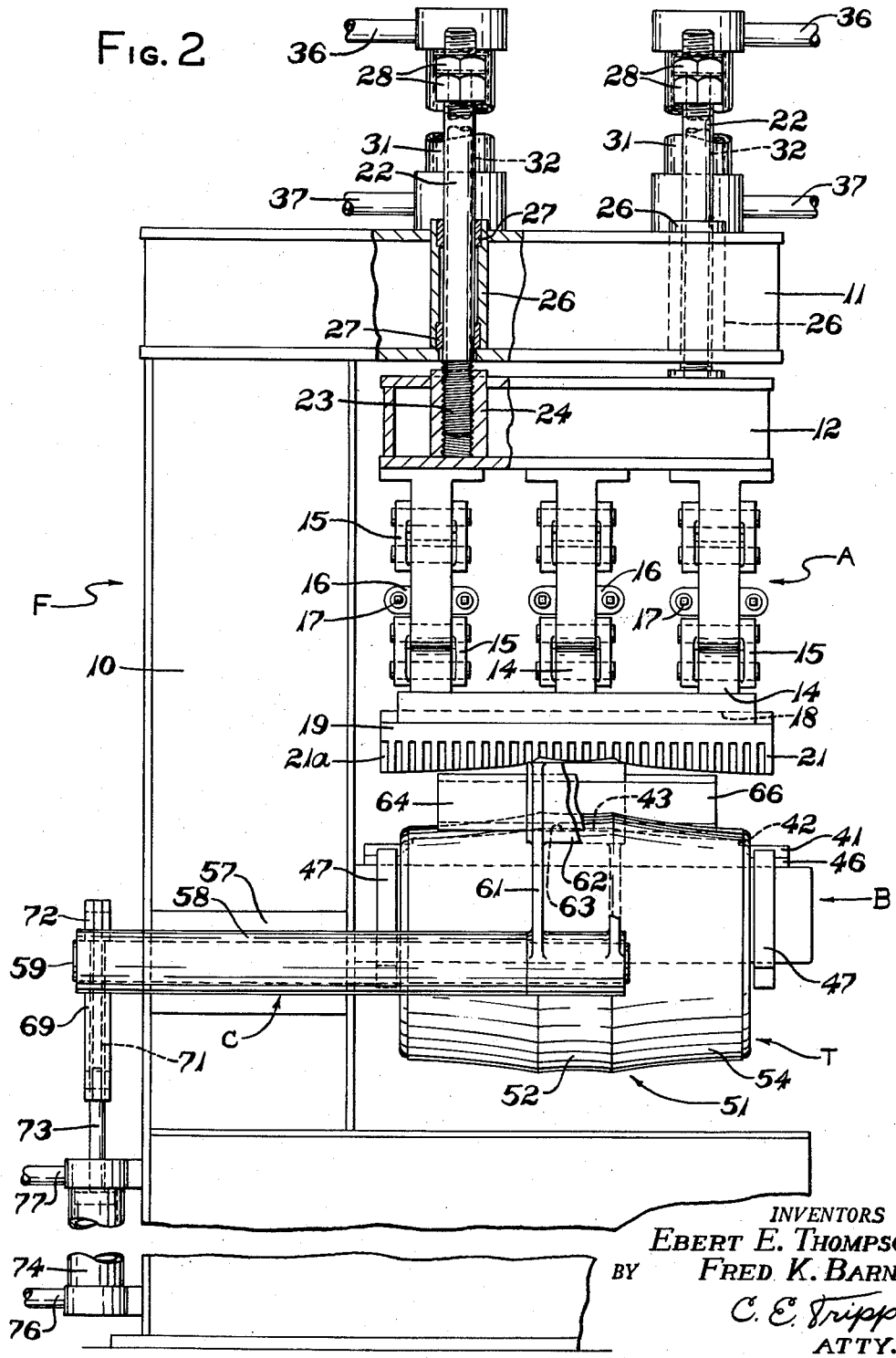

Nov. 7, 1961 F. K. BARNS ET AL 3,007,511
PROFILED TIRE TREAD SPLICING
Filed Aug. 19, 1958 4 Sheets-Sheet 3
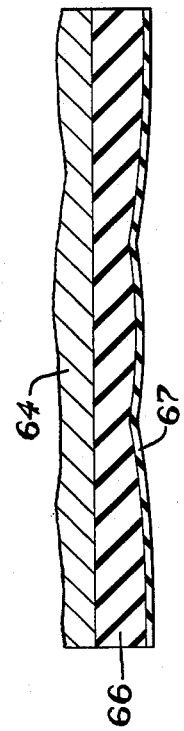
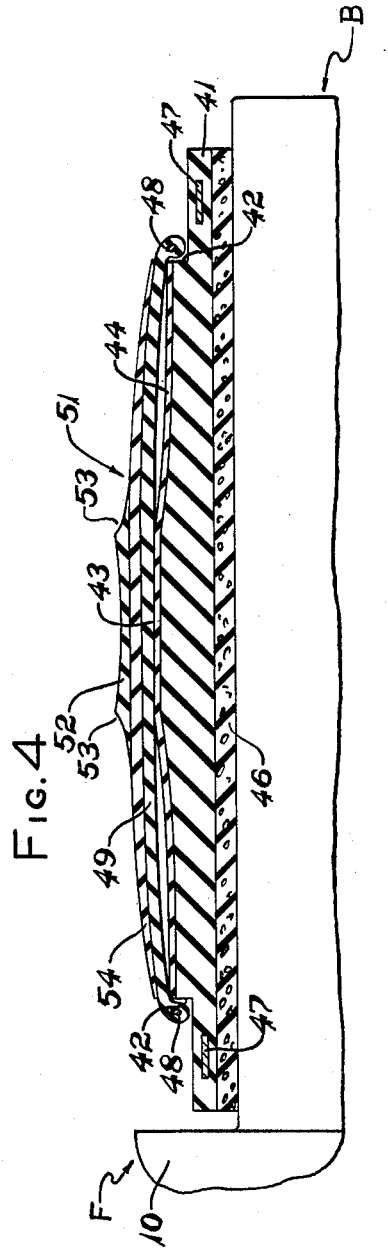
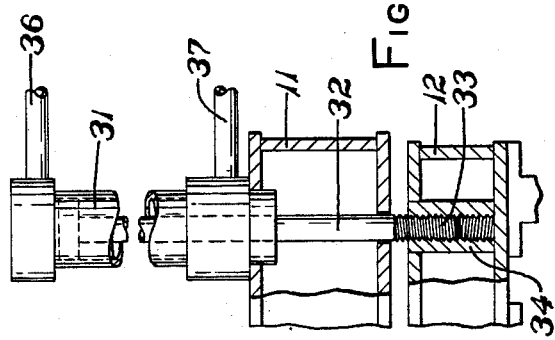
INVENTORS
EBERT E. THOMPSON
BY FRED K. BARNS
C. E. Tripp
ATTY.

United States Patent Office 3,007,511
Patented Nov. 7, 1961

3,007,511
PROFILED TIRE TREAD SPLICING
Fred K. Barns and Ebert E. Thompson, Akron, Ohio, assignors to The B. F. Goodrich Company, New York, N.Y., a corporation of New York
Filed Aug. 19, 1958, Ser. No. 755,969
11 Claims. (Cl. 156—394)

This invention relates to tire building apparatus, more particularly, to an apparatus for splicing the joint in a tire tread strip of unvulcanized rubber and even more particularly to performing the splice after the tread strip is applied to a green or uncured tire carcass.

With modern large section, low-inflation tires having a relatively heavy tread portion, coupled with the high-speed operation often encountered in service, the splice area of tire treads has caused considerable difficulty. This difficulty has manifested itself as separation of the splice itself, or at times, separation of the tread from the carcass at the splice, due to a weak splice or to air trapped between the tread and the carcass or both. It has been customary where tire treads are applied as strips with their ends spliced on the building drum to rely on manual stitching or roller stitching with mechanically operated splice traversing rollers. The splices thus made have often left much to be desired, as indicated above, and at times air has been trapped beneath the tread strip intermediate its edges because it is easier to join the tread strip to the carcass at the thin sidewall portions than at the thicker tread or crown portion during splicing. Such trapped air, remaining underneath the tread strip during cure may prevent a firm bond.

In accordance with this invention the splice is made by a series of mechanically actuated interfitting jaws extending entirely across the tire at the splice and contoured to conform to the outer side of the tread and sidewall strip. As these jaws are pressed forceably against the splice, a mechanism causes them to move in alternate circumferential directions and in interfitting relation to compact, knead and press the splice edges of the rubber stock together as the splicing pressure is applied.

There is a cantilever arm type support or table for the tire being spliced that is fitted with a rubber back-up pad contoured so as to be highest (humped) in the mid-plane area and the pad rests on a sponge rubber under pad so that during the splicing action, the tire is pressed progressively against the back-up pad from the mid-plane towards each side. This tends to expel air laterally from the crown to the edges which air might otherwise be trapped under the tread strip during the splicing operation.

Another feature of the invention is that of clamping the tread strip and tire carcass adjacent to the splicing jaws to confine any flow of rubber that might occur away from the splice due to splicing pressure to a localized zone between the clamp jaws and the splicing jaws. When the spliced tire is removed from the apparatus, this local bulge of rubber reverts by a self-restoring (rubber memory) action at the areas involved so that if the spliced green tire is allowed to stand for an hour or more after the splicing operation, the tread will regain its original contour and uniformity of thickness and there will be no problems with tire thump at the splice. On the contrary, since the splice is firmly and uniformly compacted by the contoured jaws, thump problems are reduced. The manner in which these advantages may be obtained will be apparent to one skilled in the art from the following detailed description of a preferred embodiment of the invention.

In the drawings FIG. 1 is a front view of the apparatus embodying the invention with the splicing jaws raised and the clamps opened. FIG. 2 is a side view corresponding to FIG. 1. FIG. 2-A is a fragmentary section showing the piston rod mounting for the splicing head. FIG. 3 is a section taken along the line 3—3 of FIG. 1 showing the contoured clamp jaw. FIG. 4 is an enlarged section through a tire and the support pad before splicing. FIG. 5 is a view like FIG. 1 at the end of the splicing stroke with certain parts sectioned at the mid-plane of the apparatus.

*General arrangement*

The apparatus is arranged with the tire support mounted in cantilever fashion so that the front side is open, facilitating insertion and removal of a green tire from the machine. The basic elements of the apparatus include a frame F, the lower part of which is broken away in the figures. The frame has an upright 10 that mounts a splicing head assembly A which is above and overlying the cantilever type stock support table B. The splicing assembly A is movable toward and away from the table and has jaws for engaging the stock under pressure to make the splice. In order to restrain the stock during the splicing operation, a clamp assembly C is provided which has swinging clamp jaws disposed adjacent the splicing jaws. The green tire T is slipped over the support table B from the front of the machine as indicated in the drawings, the clamps are closed, and the splicing head descends to make the splice.

*The splicing assembly*

The frame F has a sturdy upright post 10 of fabricated box construction and the stock table B is rigidly mounted to extend horizontally from the post as best seen in FIG. 2. Extending from the upper end of the upright 10 is a cantilever mounting bar 11 for supporting the splicing assembly. The splicing assembly is carried by a splicing head beam 12 disposed underneath the mounting bar 11. Two rows of jaw mounting plates 14 are suspended beneath the splicing head beam 12 by means of upper and lower parallel links 15. In order to retract the jaws as the splicing head rises, the plates 14 have ears 16 that are spread by coil springs 16A whose pressure can be adjusted by threaded plugs 17 mounted in the ears. In order to mount the splicing jaws on plates 14 the lower ends of the plates are formed with dovetail grooves 18 which receive right and left elongated jaw carriers 19 and 19A. Extending integrally downwardly from each jaw carrier are right and left sets of spaced splicing jaws 21 and 21A, which are closely inter-fitting as seen in FIG. 2. The stock engaging edges of the jaws are toothed or serrated. It will be noted in this regard that the lower faces, that is, the stock engaging faces of the jaws are collectively machined to a contour which represents the contour of the rubber tread and sidewall strip of a green tire. The splicing head beam 12 is slidably mounted in the bar 11 by means of guide rods 22 having threaded ends 23 mounted in threaded tubes 24 integral with beam 12. These rods slide through sleeves 26 in the mounting bar 11, the sleeves having bushings 27 pressed therein. Adjustable stop nuts 28 limit the downward travel of the splicing head and so prevent excessive deformation of the tread during the splicing operation.

In order to raise and lower the head assembly as well as press it against the stock, a pair of operating cylinders 31 are provided having pistons therein connected to rods 32 which have threaded ends 33 screwed into posts 34 integral with the splicing head beam 12, as seen in FIG. 2a. Conduits 36 and 37 are provided for admitting fluid under pressure for operating the cylinders to lower and raise the head, respectively. The usual control valves for a source of fluid under pressure are provided but are not shown as these are conventional design elements in all fluid-pressure operated machinery.

The structure at the stock table B is best seen in FIGS. 1, 2 and 4. Resting on the table is a rubber pad 41, which pad is formed of tough rubber stock such as tire tread stock having a durometer of about 55 to 65 Shore scale A. A tire bead recess 42 is formed at each end to receive the tire beads of a green carcass. The pad is humped or raised at the middle portion as at 43 to provide for progressive expulsion of air during the splicing operation. The rubber pad 41 may be covered with a thin layer 44 of Neoprene rubber to prevent adhesion of the pad with the tire tread. The pad 41 rests on a sponge rubber cushion 46 to facilitate flattening and accommodation of the pad's outer surface to the tread contour during formation of the splice. The tire pad and cushion assembly is retained on table B by straps 47.

As best seen in FIG. 4 the green tire has inextensible beads 48 accommodated by recesses 42 in pad 41. The usual carcass 49 of rubberized cord fabric is provided, and the combined tread and sidewall strip of rubber 51 surrounds the carcass there being a thickened concave tread portion 52 having shoulders 53 gradually merging with thinner sidewall portions 54. The skived or beveled splice joint 56 appears in FIGS. 1 and 5.

The clamping assembly

The clamping assembly is best seen in FIGS. 1, 2, and 5. Referring to FIG. 1, there is a mounting bracket 57 bolted to each side of the upright 10. Each bracket has a long sleeve 58 that receives a shaft 59. At the front end of the shaft is keyed a clamp arm 61 which is integral with an elongated clamp jaw carrier 62. This carrier has an undercut groove 63 for receiving the clamp jaw 64. A rubber strip 66 of tread stock is bonded to the member 64 and covered with a layer 67 of Neoprene to prevent adhesion with the tread strip. As seen in FIG. 3, the outer surface of the clamp member is contoured to match the contour of the tread strip.

In order to actuate the clamp jaws, each shaft 59 has keyed thereto a crank 69 disposed on the rear side of the machine. Each crank 69 is pinned to a toggle link 71. These links have their other ends pinned to a piston rod bracket 72, which bracket is attached to the piston rod 73 operated by the usual piston slidable in the cylinder 74. Air pressure inlets 76 and 77, FIG. 2, provide for clamping and retracting the clamp jaws. Disposed along each side of the support table B is a pair of anvils 78. As seen in FIGS. 1 and 5, these anvils are arranged adjacent to the table so that the green tire can rest upon them. This completes the detailed description of the construction of the apparatus.

Operation

It has been found preferable to build the tire by applying the tread strip to the green carcass on the tire building drum before using the apparatus of this invention to form and compact the splice, and that is the procedure that will be described. When the green tire is presented to the machine, it appears as in the section of FIG. 4 with the inner surface of the carcass plies resting on the hump 43 on the pad 41. The tire beads are disposed in the recesses 42 formed on the pad. The clamps 64 will be in their retracted positions and the splicing head in its raised position. By manipulating suitable valves, fluid is admitted to cylinder 74 to close the clamp jaws and compress the tire against the anvils 78. Other valves are then manipulated to admit fluid under pressure to cylinders 31 (inlets 36) in order to cause the splicing head assembly to descend, so that the jaws 21 and 21A engage the tire tread strip. Further downward motion of the splicing head causes the plates 14 to approach one another against the force of springs 16A, under the action of links 15. Due to the interfitting relationship of the jaws 21 and 21A, the tread stock is firmly pressed and alternately kneaded as the descent of the splicing head continues, making a firm compact splice. This splice is improved and compacted along the entire width of the tread and sidewall strip, because of the contour of the various jaws best seen in FIG. 2. During this action pressure first occurs between the inner side of the carcass and the hump 43 at the mid-plane of the pad, and contact continues from this mid-area progressively toward each side, so that the splicing operation does not trap air between the tread and sidewall strip and the carcass but rather any air in this zone is progressively expelled to each side so that good adhesion between the tread and sidewall rubber and the carcass will be maintained at the splice during cure.

As seen in FIG. 5, wherein the splicing operation has been completed and the jaws are at the lower end of the stroke, some tread and sidewall rubber is displaced circumferentially due to the heavy splicing pressure which may be in the order of 80 p.s.i. This rubber is trapped between the splicing jaws and the clamp jaw and anvil assemblies in the form of slight humps 81 disposed at each side of the clamp jaws. These humps serve a duel purpose; first, since rubber cannot readily flow away from the spliced zone because of the clamp assembly, the splice is backed up or stated differently, the splicing pressure does not open up the splice. Secondly, the displaced rubber in humps 81 tends to return to its original position at the splice zone as soon as the green tire is removed from the apparatus. Experience has shown that due to the "rubbery memory" phenomenon 95% of the displaced rubber will have restored itself to its original position in 30 minutes at room temperature and if the tire is allowed to stand for an hour or so before it is cured, no noticeable rubber displacement can be detected in the cured tire. This statement is borne out by laboratory tests of tires cured after being spliced in the apparatus of this invention by means of highly developed sensitive tire thump measuring apparatus as well as by ride tests on the tires conducted by experienced tire testing engineers.

Splices made with the apparatus of this invention have excellent adhesion and the problem of tread separation, which has constantly plagued tire manufacturers in modern times, has been greatly reduced. The operation is very simple and rapid requiring only a period of 15 seconds to insert the tire in the machine, make the splice, and remove it.

Because of the rubber pads under the splice and the nature of the material being spliced, the contour of the splicing jaws can be selected to be suitable for a number of sizes and contours of the tread and sidewall strips being spliced.

Although the stock-engaging surfaces are toothed or serrated, we have found it desirable to relieve the teeth slightly at the shoulders 53 of the tread, that is, at the zone or wherein the tread rubber merges with the sidewall rubber 54, to avoid tearing of the stock.

The embodiments of the invention in which an exclusive property or privilege is claimed are defined as follows:

1. Apparatus for splicing a transversely extending skived joint in a tire tread strip of unvulcanized rubber, said tread strip being transversely contoured on the outer side to provide a relatively thick tread portion joined at each side to a tapered sidewall portion, the said apparatus comprising a frame, a horizontal stock support table mounted on said frame, a splicing assembly including a splicing head beam, means mounting said beam on said frame for motion toward and away from the table, spaced opposed splicing jaw mounting posts depending from said beam, a jaw carrying plate for each post, means connecting each jaw carrying plate to its associated post in a manner permitting movement of the plates toward and from the opposed post, means to normally urge said plates toward their respective posts, opposed jaw carriers mounted on the lower ends of said jaw carrying plates, opposed stock engaging jaws projecting downwardly from said carriers transversely of the strip to be spliced, spaced projections on each jaw, the said projections on one jaw extending toward and interfitting with the projections on the opposed jaw and with each of the interfitting projections extending transversely over both ends of the strip to be spliced, the tread strip engaging faces of said jaws having configurations complementary to the contour of the outer side of the tread, and means to lower and raise said beam to and from a position of pressure-exerting contact of the said jaws with a tread strip splice area on said table, said pressure causing said jaw carriers to move toward each other so that the jaws knead the stock in alternate opposite directions thereby firmly joining the skived ends of the stock at the splice.

2. Apparatus for splicing a transversely skived joint in a tire tread strip of unvulcanized rubber, said tread strip being transversely contoured on the outer side to provide a relatively thick tread portion joined at each side to a tapered sidewall portion, the said apparatus comprising a frame, a horizontal stock support table mounted on said frame, a splicing assembly including a splicing head beam, means mounting said beam on said frame for rectilinear motion toward and away from said table, spaced opposed splicing jaw mounting posts depending from said beam, a jaw carrying plate for each post, means pivotally connecting each jaw carrying plate to its associated post in a manner maintaining said plates parallel and permitting parallel movement of the plates toward and from the opposed post, means normally urging said plates toward their respective posts, opposed elongated jaw carriers mounted on the lower ends of said jaw carrying plates, opposed stock engaging jaws projecting downwardly from said carriers transversely of the strip to be spliced, spaced projections on each jaw, the said projections on one jaw extending toward and interfitting with the projections on the opposed jaw and with each of the interfitting projections extending transversely over both ends of the strip to be spliced, the tread strip engaging faces of said jaws having configurations complementary to the contour of the outer side of the strip, and means to lower and raise said beam to and from a position of pressure-exerting contact of said jaws with a tread strip splice area on said table, said pressure causing said jaw carriers to move toward each other so that the jaws knead the stock in alternate opposite directions thereby joining the skived ends of the stock at the splice.

3. Apparatus for splicing a transversely extending skived joint in a tire tread strip of unvulcanized rubber, said tread strip being transversely contoured on the outer side to provide a relatively thick tread portion joined at each side to a tapered sidewall portion, the said apparatus comprising a frame, a horizontal stock support table mounted on said frame, a splicing assembly including a splicing head beam, means mounting said beam on said frame for motion toward and away from said table, spaced opposed splicing jaw mounting posts depending from said beam, a jaw carrying plate for each post, means connecting each jaw carrying plate to its associated post in a manner permitting movement of the plates toward and from the opposed post, means normally urging said plates toward their respective posts, opposed jaw carriers mounted on the lower ends of said jaw carrying plates, opposed stock engaging jaws projecting downwardly from said carriers transversely of the strip to be spliced, spaced projections on each jaw, the said projections on one jaw extending toward and interfitting with the projections on the opposed jaw and with each of the interfitting projections extending transversely over both ends of the strip to be spliced, the tread strip engaging faces of said jaws having configurations complementary to the contour of the outer side of the strip, means to lower and raise said beam to and from a position of pressure-exerting contact of said jaws with a tread strip splice area on said table, said pressure causing said jaw carriers to approach one another so that the jaws knead the stock in alternate opposite directions thereby firmly joining the skived ends of the stock at the splice, and a rubber pad on said table the stock engaging surface of which pad is convexly curved transversely of the strip to be spliced thereby providing progressive pressure of the jaws on the splice area laterally outwardly from the mid-section of the latter during the splicing operation.

4. Apparatus for splicing a transversely extending skived joint in a tire tread strip of unvulcanized rubber, said tread strip being transversely contoured on the outer side to provide a relatively thick tread portion joined at each side to a tapered sidewall portion, the said apparatus comprising a frame upright, a cantilever stock support table projecting from said frame upright, a splicing assembly mounting bar projecting from said upright above and overlying said stock support table, a splicing head beam under said mounting bar, means mounting said beam on said mounting bar for vertical movement relative thereto, spaced opposed splicing jaw mounting posts depending from said beam, a jaw carrying plate for each post, parallel links pivotally connecting each jaw carrying plate to its associated post, spring means normally urging said plates toward their respective posts, opposed elongated jaw carriers mounted on the lower ends of said jaw carrying plates, opposed stock engaging jaws projecting downwardly from said carriers transversely of the strip to be spliced, spaced projections on one jaw extending toward and interfitting with the projections on the opposed jaw and with each of the interfitting projections extending transversely over both ends of the strip to be spliced, the tread strip engaging faces of said jaws having configurations complementary to the contour of the outer side of the strip, and means to lower and raise said beam to and from a position of pressure-exerting contact of said jaws with a tread strip splice on said table, said pressure contact causing said jaw carriers to approach one another so that the jaws knead the stock in alternate opposite directions thereby firmly joining the skived ends of the stock at the splice.

5. Apparatus for splicing a transversely skived joint in a tire tread strip of unvulcanized rubber while it is applied to an annular green tire carcass, said tread strip being transversely contoured on the outer side to provide a relatively thick tread portion joined at each side to a tapered sidewall portion, the said apparatus comprising a frame, a horizontal stock support table on said frame, a splicing assembly mounting bar on said frame disposed above said support table, a splicing head beam under said mounting bar, means mounting said beam on said mounting bar for vertical movement relative thereto, spaced opposed splicing jaw mounting posts depending from said beam, a jaw carrying plate for each post, parallel links connecting each jaw carrying plate to its associated post, spring means normally urging said plates toward their respective posts, opposed elongated jaw carriers mounted on the lower ends of said jaw carrying plates, opposed stock engaging jaws projecting downwardly from said carriers transversely of the strip to be spliced, spaced projections on each jaw, the said projections on each jaw extending toward and interfitting with the projections on the opposed jaw and with each of the interfitting projections extending transversely over both ends of the strip to be spliced, the tread strip engaging faces of said jaws having configurations complementary to the contour of the outer side of the strip, means to lower and raise said beam to and from a position of pressure-exerting contact of said jaws against a tread strip splice on said table, the said pressure-exerting contact causing said jaws to approach one another thereby kneading the stock in alternate opposite directions and firmly joining the skived ends of the stock at the splice, and clamp means at each side of and adjacent said table operable to transversely engage and clamp the strip being spliced on either side of said splicing assembly thereby restraining the flow of tread rubber circumferentially away from the splice area during the splicing operation.

6. Apparatus for splicing a transversely skived joint in a tire tread strip of unvulcanized rubber while it is applied to an annular green carcass, said tread strip being transversely contoured on the outer side to provide a relatively thick tread portion joined at each side to a tapered sidewall portion, the said apparatus comprising a frame upright, a horizontal stock support table projecting from said frame, a splicing assembly mounting bar mounted on said frame above said stock support table, rubber pad means on said table adapted to have a tire carcass supported thereon, the said pad means being convexly curved transversely of the carcass supported thereon with the high point of said pad means at the midsection thereof, a splicing head beam under said mounting bar, means mounting said beam on said mounting bar for vertical movement of the beam relative to the bar, spaced opposed splicing jaw mounting posts depending from said beam, a jaw carrying plate for each post, parallel links connecting each jaw carrying plate to its associated post, spring means normally urging said plates toward their respective posts, opposed elongated jaw carriers mounted on the lower ends of said jaw carrying plates, opposed stock engaging jaws projecting downwardly from said carriers transversely of the strip to be spliced, spaced projections on each jaw, the projections on each jaw extending toward and interfitting with the projections on the opposed jaw and with each of the interfitting projections extending transversely over both ends of the strip to be spliced, the tread strip engaging faces of said jaws having configurations complementary to the contour of the outer side of the strip, means to lower and raise said beam to and from a position of pressure-exerting contact of said jaws with a tread strip splice on said table, the said pressure causing said jaws to approach one another thereby kneading the stock in alternate opposite directions and firmly joining the skived ends of the stock at the splice, the pressure of said jaws on the strip also pressing the underside of said carcass against said pad means progressively from the mid-section toward each edge thereby causing air trapped between the tread strip and the carcass to be laterally expelled at the splice region.

7. An apparatus for splicing the complementarily beveled transverse edges of a tire tread strip of unvulcanized rubber stock which strip is of greater thickness in the central portion than adjacent the longitudinal edges, the said apparatus comprising a supporting table for the region of the strip to be spliced, opposed splicing jaws the lower surfaces of which have configurations complementary to the outer surface of the strip to be spliced which outer surface is uppermost when the strip is placed on said table, a plurality of spaced projections extending laterally from each jaw, means supporting said jaws above said table with the said projections on one jaw interfitting the projections on the opposite jaw and with each of the interfitting projections extending transversely over both the transverse edges of the ends of the strip to be spliced, the said supporting means including pivotal linkage connections to said jaws in a manner permitting movement of the jaws toward and from each other, and a single means to simultaneously move said supporting means and all of said jaws vertically to and from a position of jaw exerting pressure on the strip being spliced, the pressure-exerting contact of said jaws on the strip causing the jaws to move toward each other thereby splicing the ends of the strip by combined pressure and small area alternately directed displacements of the strip material transversely of the splice.

8. An apparatus for splicing the complementarily beveled transverse edges of a tire tread strip of unvulcanized rubber stock, which strip is of greater thickness in the central portion than adjacent the longitudinal edges thereof, the said apparatus comprising a horizontally extending supporting table for the region of the strip to be spliced, opposed splicing jaws the lower surfaces of which have configurations complementary to the outer surface of the strip to be spliced which outer surface is uppermost when the strip is placed on said table, a plurality of spaced projections extending laterally from each jaw, means supporting said jaws above said table with the said projections on one jaw interfitting the projections on the opposite jaw and with each of the interfitting projections extending transversely over both the transverse edges of the ends of the strip to be spliced, the said supporting means including a beam mounted for vertical movement above said table and two sets of parallel links pivotally connected to said beam in spaced relationship with each set of links respectively pivotally connected to one each of said jaws in a manner permitting movement of the jaws toward and from each other, and means to move said beam to and from a position of jaw exerting pressure on the strip being spliced, the pressure exerted by the jaws on the said strip causing the jaws to move toward each other thereby splicing the ends of the strip by combined pressure and alternately directed small area displacements of the strip material transversely of the splice.

9. The apparatus of claim 1, wherein clamp means are provided at each side of said splicing assembly and adjacent said table, the said clamp means each including opposed cooperating portions extending transversely of the strip to be spliced for clamping it therebetween to thereby restrain the flow of tread rubber away from the splice area during the splicing operation, whereby tread rubber trapped between the jaws and the clamp means flows back to the spliced area on release of the splicing jaws.

10. The apparatus of claim 6 wherein said pad means includes a sponge rubber pad lying against the table, and an outer covering of strong, carbon black, reinforced tire tread type rubber material resting on said sponge rubber pad.

11. The apparatus of claim 6 including clamp means at each side of said splicing assembly and adjacent said table operable to transversely engage and clamp the strip being spliced thereby restraining the flow of tread rubber circumferentially away from the splice area during the splicing operation.

References Cited in the file of this patent

UNITED STATES PATENTS

| | | |
|---|---|---|
| 2,186,286 | Engler et al. | Jan. 9, 1940 |
| 2,273,185 | Engler et al. | Feb. 17, 1942 |
| 2,273,463 | Campbell et al. | Feb. 17, 1942 |
| 2,409,571 | Leguillon | Oct. 15, 1946 |
| 2,487,149 | Leguillon | Nov. 8, 1949 |
| 2,489,324 | Remark | Nov. 29, 1949 |
| 2,556,306 | Vickers | June 12, 1951 |
| 2,562,540 | Engler et al. | July 31, 1951 |